Sept. 1, 1925.  
M. WALTER  
1,551,594
ELECTRIC MOTOR VEHICLE
Filed Oct. 27, 1922  2 Sheets-Sheet 1
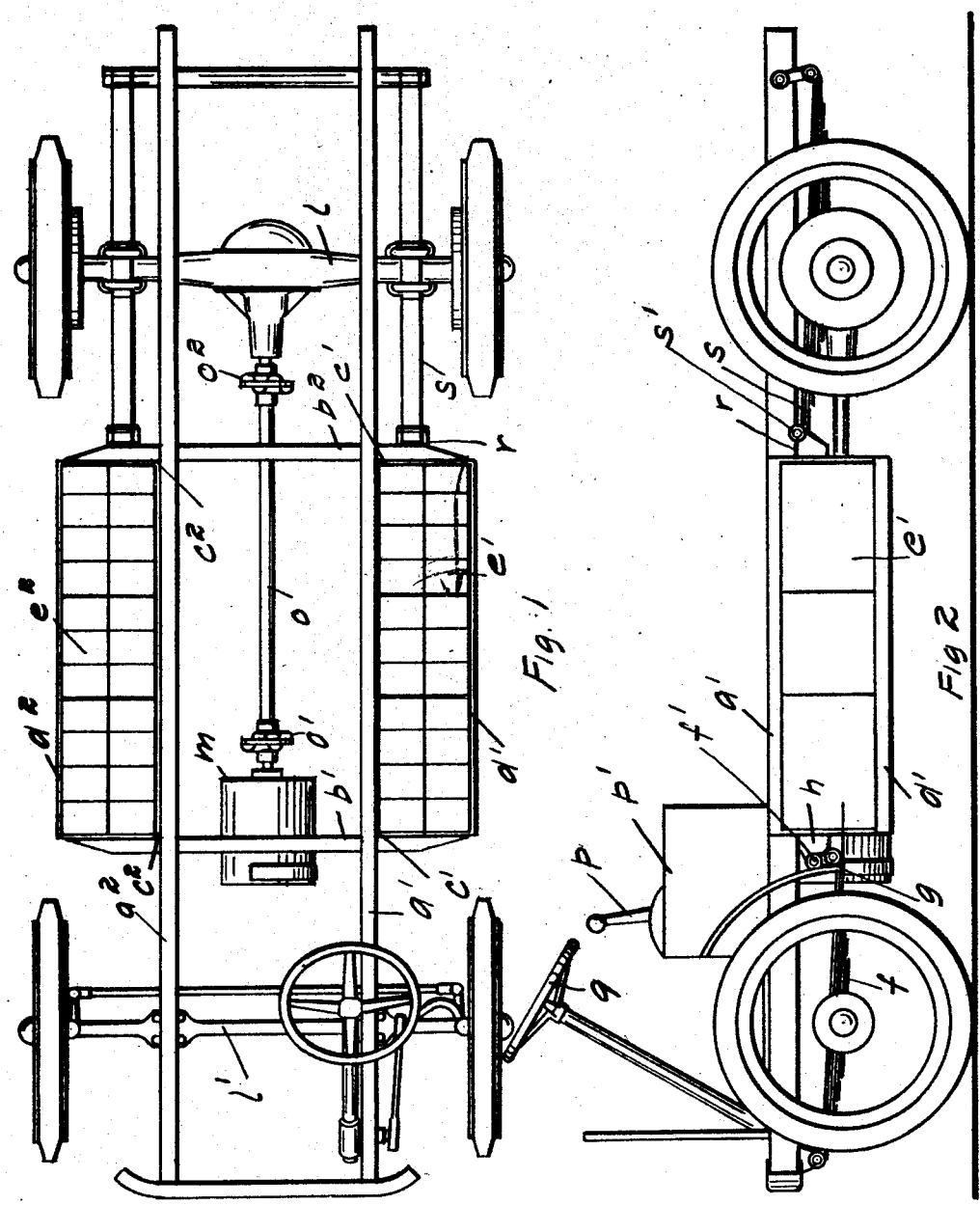
WITNESSES:
INVENTOR.
Maurice Walter
BY
ATTORNEYS

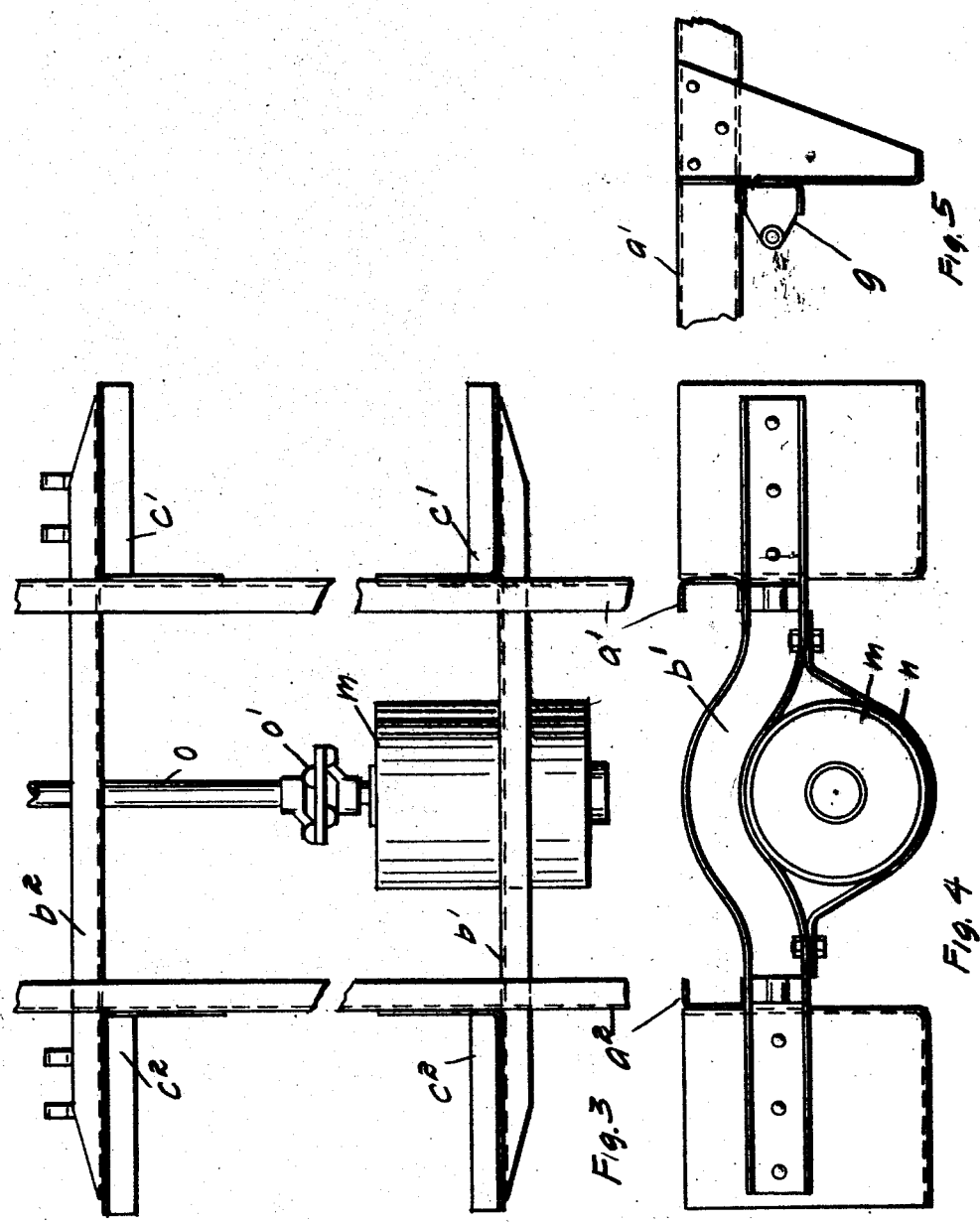

Patented Sept. 1, 1925.

1,551,594

UNITED STATES PATENT OFFICE.

MAURICE WALTER, OF NEW YORK, N. Y.

ELECTRIC MOTOR VEHICLE.

Application filed October 27, 1922. Serial No. 597,232.

*To all whom it may concern:*

Be it known that I, MAURICE WALTER, a citizen of the United States, residing in the borough of Manhattan, of the city of New York, in the State of New York, have invented certain new and useful Improvements in Electric Motor Vehicles, of which the following is a specification, reference being had to the accompanying drawings, forming a part hereof.

This invention relates to electric motor vehicles and has for its general objects to improve the mounting of the batteries and the propelling motor to the end that certain desirable practises, generally recognized but heretofore unobtainable, may be realized. Generally speaking, in a vehicle of this character it is desirable to spring the weight of both the batteries and the propelling motor, mounting them in positions which are accessible for removal or inspection, relieve the frame members of the chassis of the stresses ordinarily imposed on them by the weight of the batteries and the motor, and so mount the motor with respect to the final drive as to permit the starting torque to be cushioned. More particularly, in electric motor vehicle practise it will be recognized as desirable to provide a low chassis and yet maintain relatively great ground clearance, and also to mount the motor in proximity to the controller and the batteries so that the leads may be of the shortest possible length.

Heretofore, the conditions enumerated have not been attained by reason of the natural difficulties offered and the close adherence to practices established in the early days. For instance, batteries have usually been mounted on the frame members of the chassis in the space therebetween and under the body thus at times subjecting the frame to great stresses from the concentrated battery load, making the batteries inaccessible and throwing the motor to the rear of the batteries and in close proximity to the axle without the opportunity for cushioning the starting torque at some point between the motor and the final drive.

In accordance with the present invention it is proposed to change the established practices completely and support the batteries and the motor directly on the vehicle springs and, in turn, support the frame members of the chassis on the supporting frame for the batteries and motor. By this construction the frame is relieved of the concentrated loads imposed by the batteries and the motor and it becomes possible to insure maximum ground clearance with minimum chassis height. It is further proposed in the preferred embodiment to mount the batteries in separate banks at opposite sides of the frame members and, preferably, outside of the frame members so as to be wholly exposed for removal or inspection. The practical advantage of this disposition resides in the fact that the space between the side frame members is left wholly free and the motor may be mounted anywhere within this space which is advantageous. Best practice dictates that the motor should be supported between the frame members near the controller on the driver's seat and some distance from the final drive thereby affording a propeller shaft of substantial length in which may be interposed cushioning devices for the starting torque.

Reference is now to be had to the accompanying drawings for a detail description of the preferred embodiment in which:

Figure 1 is a view in plan of a motor vehicle chassis in which the elements are disposed in accordance with the invention, the front springs and controller being omitted.

Figure 2 is a view in side elevation of the chassis shown in Figure 1 with the front springs and controller indicated in their relation to the other elements.

Figure 3 is a fragmentary detail view in plan showing the supporting frame for the batteries and motor and the relation of the side frame members of the chassis thereto.

Figure 4 is a view in front elevation of the parts shown in Figure 3 the side frame members being shown in transverse section.

Figure 5 is a fragmentary detail view of one of the supporting brackets for the batteries.

While it will be understood as the description proceeds that the invention, in its broader aspects, is not limited to the precise relation of parts shown herein since some of the advantages of the invention may be realized in a construction in which the parts occupy different relations it is believed, in practice, that the construction shown in Figure 1 will be found thoroughly efficient and most desirable. As indicated, the rear axle $l$ and front axle $l'$ have supported thereon, respectively, springs $s$ and $f$, which may be of any usual character. The proximate ends of these springs $s$, $f$, are pivoted as at $s'$, $f'$, respectively, to brackets $r$, $h$, carried with the transverse frame members $b^2$, $b'$. Springs $s$ will, in ordinary practice, be pivoted direct to the bracket $r$ while the rear ends of the front springs $f$ may be pivoted in the usual manner through shackles $g$. On the transverse frame members $b'$, $b^2$, are supported the side frame members $a'$, $a^2$, of the chassis frame. In the preferred construction, corner gussets $c'$, $c^2$, will be secured to the transverse frame members $b'$, $b^2$, at points outside of the side frame members $a'$, $a^2$, respectively, these corner gussets being flanged as shown clearly in Figure 3 to support removably battery trays $d'$, $d^2$, on which may be carried the battery $e'$, $e^2$. The trays $d'$, $d^2$, and the several batteries $e'$, $e^2$, supported thereon may be removed separately and are, at all times, conveniently accessible.

The disposition of the batteries leaves a space between the side frame members $a'$, $a^2$, wholly free for mounting of the propelling motor $m$ at any point which is deemed most desirable taking into account mechanical considerations and clearance. As shown, the motor $m$ is supported by means of a strap $n$ on the underside of the front cross-frame member $b'$, the latter being bowed, if desired, to increase ground clearance and insure substantial horizontality of the propeller shaft $o$. The motor $m$ by the improved mounting is directly suspended on the frame member $b'$ on the front springs $f$ between which the member extends. In the propeller shaft $o$ between the motor $m$ and the rear axle $l$ may be interposed one or more flexible joints $o'$, $o^2$, affording some cushioning of the starting torque. This desirable condition has not been obtainable in any effective degree heretofore by reason of the fact that the motor $m$ has heretofore been mounted so close to the rear axle $l$ as to afford insufficient space for the interposition of such cushioning devices.

As indicated in Figures 1 and 2 the controller $p$ for the motor may be carried in proximity to the motor $m$, as by the drivers' seats $p'$ which is disposed in the usual relation to the steering wheel $q$. Very short leads may extend from the controller $p$ to the motor $m$ and to the batteries $e'$, $e^2$, since all of the parts are disposed in relative proximity.

The advantages afforded by the construction have been indicated hereinbefore and are made clear by the specific embodiment described by way of example. The chassis is relatively low and the frame members relatively light since in the construction they do not support the battery and motor units. The ground clearance is great since the batteries need not be hung from the side frame members. The torque effort of the motor is uniform and efficient for the purpose intended by reason of the relation of the motor to the final drive. All of the parts are sprung directly on the vehicle springs and the frame is relieved of concentrated loads.

Rearrangement of the elements may be made without departing from the spirit of the invention and one or more of the structural features thereof may be embodied in a vehicle without the others.

What I claim is:

1. In an electric motor vehicle in combination with the vehicle springs, transverse frame members carried thereby, motor and battery units carried directly by said transverse frame members and longitudinal chassis frame members supported by said transverse members.

2. In combination with the front and rear springs of a motor vehicle transverse frame members secured respectively to the rear ends of the front springs and the front ends of the rear springs, and batteries supported at their ends by said frame members alongside of the side frame members of the chassis.

3. In an electric motor vehicle in combination with the front springs and rear springs transverse frame members secured respectively to the rear ends of the front springs and the front ends of the rear springs, batteries supported by said members outside of the side frame members of the chassis and a propelling motor supported by one of said transverse members.

4. In an electric motor vehicle in combination with a controller, batteries and a motor, means to support the batteries alongside of and wholly without the side frame members and means to support the motor in between the side frame members between the batteries, said batteries, controller and motor being in proximity for electrical connection.

5. In an electric motor vehicle in combination with the springs transverse frame members extending between the proximate ends thereof, respectively, longitudinal side frame members of the vehicle supported on said transverse members, batteries supported on the transverse members outside of the longitudinal frame members, a motor supported on one of said transverse frame members between the longitudinal members, a shaft operatively connecting the motor and the final drive and cushion devices interposed in said shaft to cushion the starting torque.

This specification signed this 25 day of October, A. D. 1922.

MAURICE WALTER.